United States Patent
Guillou et al.

(10) Patent No.: US 11,572,960 B2
(45) Date of Patent: Feb. 7, 2023

(54) VALVE OF A HYDRAULIC CIRCUIT WITH CONSTANT PRESSURE DROP

(71) Applicant: SAFRAN AIRCRAFT ENGINES, Paris (FR)

(72) Inventors: Lancelot Guillou, Moissy-Cramayel (FR); Stéphane Louis Lucien Auberger, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 44 days.

(21) Appl. No.: 16/769,480

(22) PCT Filed: Dec. 3, 2018

(86) PCT No.: PCT/FR2018/053080
§ 371 (c)(1),
(2) Date: Jun. 3, 2020

(87) PCT Pub. No.: WO2019/110901
PCT Pub. Date: Jun. 13, 2019

(65) Prior Publication Data
US 2020/0386337 A1    Dec. 10, 2020

(30) Foreign Application Priority Data

Dec. 5, 2017    (FR) ...................................... 1761637

(51) Int. Cl.
*F16K 17/04*    (2006.01)
*F16K 3/24*    (2006.01)
(Continued)

(52) U.S. Cl.
CPC .......... *F16K 17/0466* (2013.01); *F16K 3/246* (2013.01); *F16K 39/04* (2013.01);
(Continued)

(58) Field of Classification Search
CPC ...... F16K 17/0466; F16K 3/246; F16K 39/04; F16K 1/385; F16K 15/025; F16K 15/026; Y10T 137/7929; Y10T 137/7837–7939
(Continued)

(56) References Cited

U.S. PATENT DOCUMENTS 811,185 A * 1/1906 Ten Eyck .............. F16K 15/026
137/540
1,947,071 A * 2/1934 Walton ................ F04B 53/1087
251/172

(Continued)

FOREIGN PATENT DOCUMENTS

CN    106 402 435 A    2/2017
DE    12 28 880 B    11/1966
(Continued)

OTHER PUBLICATIONS

International Search Report and Written Opinion (with English Translation of Categories of Cited Documents) dated Feb. 21, 2019 in PCT/FR2018/053080 filed on Dec. 3, 2018, 15 pages.
(Continued)

*Primary Examiner* — Craig J Price
(74) *Attorney, Agent, or Firm* — Oblon, McClelland, Maier & Neustadt, L.L.P.

(57) ABSTRACT

A pressure valve including a body including at least one admission opening and at least one discharge opening, a slide valve sliding in the body, the slide valve defining a chamber, with the body, and including a head arranged facing a seat of the admission opening, a spring pressing the head of the slide valve against the seat, a lip for applying the head to the seat. The head includes at least one hole bringing the chamber into communication with the discharge opening, each hole being arranged facing the seat and downstream from the lip in relation to the admission opening in
(Continued)

order to reduce the pressure in the chamber by a Venturi effect when the slide valve is open.

2 Claims, 3 Drawing Sheets

(51) Int. Cl.
   *F16K 39/04* (2006.01)
   *F16K 15/02* (2006.01)
(52) U.S. Cl.
   CPC ....... *F16K 15/025* (2013.01); *Y10T 137/7929* (2015.04); *Y10T 137/7938* (2015.04)
(58) Field of Classification Search
   USPC ... 137/540, 511–543.23, 538, 533.17, 515.5; 251/333, 359–365, 328, 63, 321, 324, 325
   See application file for complete search history.

(56) References Cited

U.S. PATENT DOCUMENTS

| | | | | |
|---|---|---|---|---|
| 2,221,724 A * | 11/1940 | Safford | ............... | F16K 17/082 137/469 |
| 2,234,932 A * | 3/1941 | Schlaupitz | ........... | F02M 59/462 137/538 |
| 2,318,962 A * | 5/1943 | Parker | ................. | F16K 15/026 137/513.3 |
| 2,318,963 A * | 5/1943 | Parker | ................. | F16K 15/026 137/514.7 |
| 2,431,769 A * | 12/1947 | Parker | ................. | F16K 15/026 184/105.3 |
| 2,485,092 A * | 10/1949 | Gannon | ................. | F16K 1/465 251/332 |
| 2,670,922 A * | 3/1954 | Carlisle | ................. | F16K 15/026 137/540 |
| 2,675,021 A * | 4/1954 | Allin | ................. | F16K 15/063 137/536 |
| 2,755,816 A * | 7/1956 | Collins | ................. | F16K 15/063 137/496 |
| 2,917,072 A | 12/1959 | Saville | | |
| 2,930,401 A * | 3/1960 | Cowan | ................. | F16K 15/025 417/DIG. 1 |
| 2,931,385 A * | 4/1960 | Carlisle | ................. | F16K 15/026 251/210 |
| 2,941,629 A | 6/1960 | Rohacs | | |
| 2,959,188 A * | 11/1960 | Kepner | ................. | F16K 15/026 251/363 |
| 3,030,068 A * | 4/1962 | Priese | ................. | F16K 5/0668 251/214 |
| 3,054,422 A * | 9/1962 | Napolitano | ............. | F16K 1/385 137/509 |
| 3,099,999 A * | 8/1963 | Vismara | ................. | F16K 15/026 137/625.3 |
| 3,149,643 A * | 9/1964 | Breitsprecher | ......... | F16K 17/04 137/469 |
| 3,189,046 A * | 6/1965 | Callahan | ............... | F16K 15/026 251/363 |
| 3,219,311 A * | 11/1965 | Siver | ......................... | F16K 1/42 251/86 |
| 3,438,391 A * | 4/1969 | Yocum | ..................... | F16K 1/36 137/516.29 |
| 3,457,949 A * | 7/1969 | Coulter | ................. | F16K 15/026 137/543.21 |
| 3,508,736 A * | 4/1970 | Pool | ..................... | F16K 5/0673 251/172 |
| 3,572,372 A | 3/1971 | Moore | | |
| 3,651,827 A | 3/1972 | Hammer et al. | | |
| 3,754,568 A * | 8/1973 | Gallagher | ............. | F16K 15/026 137/543.21 |
| 3,770,009 A * | 11/1973 | Miller | ..................... | F16K 15/026 251/368 |
| 3,782,412 A * | 1/1974 | Darash | ................. | F16K 17/0433 137/540 |
| 3,819,846 A * | 6/1974 | Jakobsen | ............... | H02G 15/26 174/11 R |
| 3,928,711 A * | 12/1975 | Jakobsen | ............... | H02G 15/28 174/11 R |
| 4,114,851 A * | 9/1978 | Shivak | ....................... | F16K 1/38 251/360 |
| 4,142,549 A * | 3/1979 | Autry | ..................... | F16K 17/082 137/538 |
| 4,157,170 A * | 6/1979 | McClurg | ............... | F16K 5/0668 251/315.01 |
| 4,213,021 A * | 7/1980 | Alexander | .......... | F16K 37/0033 200/82 E |
| 4,350,179 A * | 9/1982 | Bunn | ..................... | F04B 39/1053 137/484.2 |
| 4,362,185 A * | 12/1982 | Kadner | ................... | F16K 1/443 137/516.29 |
| 4,616,672 A | 10/1986 | Schmidt | | |
| 4,632,185 A * | 12/1986 | Moradi-Araghi | ...... | C09K 8/588 166/275 |
| 4,936,339 A * | 6/1990 | Bennett | ................. | F16K 15/025 137/454.6 |
| 5,056,556 A * | 10/1991 | Nishimoto | .......... | F16K 31/0606 251/359 |
| 5,092,229 A * | 3/1992 | Chen | ...................... | A47J 27/086 126/369 |
| 5,347,812 A * | 9/1994 | Nilsson | ................... | F04C 14/24 137/538 |
| 5,533,548 A | 7/1996 | Grant | | |
| 5,848,605 A * | 12/1998 | Bailey | ................... | F16K 15/063 137/543.17 |
| 5,893,389 A * | 4/1999 | Cunningham | ........ | F16K 15/063 137/516.29 |
| 5,918,628 A * | 7/1999 | Harding | ................ | F16K 15/026 137/512.1 |
| 6,637,459 B1* | 10/2003 | Smith, III | ............... | F16L 29/04 137/614.04 |
| 6,953,053 B2 * | 10/2005 | Waffler | ..................... | F16K 1/12 137/538 |
| 7,225,831 B2* | 6/2007 | Hope | ..................... | F16K 15/025 137/516.27 |
| 7,290,562 B2 * | 11/2007 | Kane | ..................... | F16K 15/026 137/538 |
| 7,395,836 B2 * | 7/2008 | Krebs | ................... | F16K 15/044 137/454.2 |
| 8,069,876 B2 * | 12/2011 | Kane | ..................... | F16K 15/026 137/538 |
| 9,702,472 B2* | 7/2017 | Burgett | .................. | F16K 24/04 |
| 10,428,962 B2 * | 10/2019 | Suzuki | ................... | F16K 15/026 |
| 10,544,878 B2 * | 1/2020 | Bartels | ................... | F16K 15/026 |
| 2001/0032675 A1* | 10/2001 | Russell | ................... | F16K 17/18 137/493.9 |
| 2004/0261861 A1* | 12/2004 | Fangmeier | ............ | F16K 15/063 137/540 |
| 2005/0016597 A1* | 1/2005 | Hope | ..................... | F16K 17/0466 137/516.27 |
| 2006/0196553 A1* | 9/2006 | Kane | ..................... | F16K 15/026 137/538 |
| 2008/0042092 A1* | 2/2008 | Endoh | ................... | F16K 15/026 251/337 |
| 2008/0191428 A1* | 8/2008 | Kane | ..................... | F16K 15/026 277/650 |
| 2008/0202604 A1* | 8/2008 | Dalton | ............... | G05D 16/0622 137/505.35 |
| 2013/0306166 A1* | 11/2013 | Erb | ....................... | F16K 17/065 137/469 |
| 2014/0182740 A1* | 7/2014 | Frenal | ..................... | F16K 1/308 141/1 |
| 2014/0216575 A1 | 8/2014 | Ikeda et al. | | |
| 2015/0034195 A1* | 2/2015 | Shima | .................. | F16K 15/021 137/528 |
| 2015/0107702 A1* | 4/2015 | Lu | ........................ | F16K 15/026 137/540 |
| 2016/0169397 A1* | 6/2016 | Ho | ....................... | F16K 15/026 137/540 |
| 2017/0108132 A1* | 4/2017 | Jurczyk | ................ | F16K 15/026 |
| 2018/0180007 A1* | 6/2018 | Shaull | .................... | F02M 59/462 |

(56) References Cited

U.S. PATENT DOCUMENTS

| | | | |
|---|---|---|---|
| 2018/0271168 A1* | 9/2018 | Qiu | A24F 40/49 |
| 2019/0292988 A1* | 9/2019 | Chabaille | F23K 5/147 |
| 2019/0292990 A1* | 9/2019 | Chabaille | F23D 11/36 |
| 2021/0278003 A1* | 9/2021 | Harigovindan | F15B 13/027 |
| 2022/0136612 A1* | 5/2022 | Nakamura | F16K 1/385 |
| | | | 137/540 |

FOREIGN PATENT DOCUMENTS

| | | |
|---|---|---|
| DE | 2 130 162 A1 | 1/1972 |
| GB | 532 599 A | 1/1941 |
| WO | WO 2012/169425 A1 | 12/2012 |

OTHER PUBLICATIONS

French Preliminary Search Report (with English Translation of Categories of Cited Documents) dated Jul. 9, 2018 in French Application No. 1761637 filed on Dec. 5, 2017, 3 pages.

The First Office Action dated Dec. 2, 2021 in corresponding Chinese Application No. 201880076851.0 (with English translation)(12 pages).

\* cited by examiner

VALVE OF A HYDRAULIC CIRCUIT WITH CONSTANT PRESSURE DROP

TECHNICAL FIELD

The invention relates to a pressure valve intended for example to protect a circuit in the event of overpressure, or to allow the passage of a hydraulic flow in the event of clogging of a main branch of a circuit, or else to control a flow in a branch called bypass branch.

PRIOR ART

As schematically shown in FIG. 1, such a pressure valve 1 typically includes a body 2 wherein a slide valve 3 slides, with a spring 4 tending to press the slide valve 3 towards a seat 6 of an intake opening 7 of the body. In such an arrangement, the diameter of the seat 6, the pretension and the stiffness of the spring 4 jointly condition a threshold value of the pressure difference between the intake 7 and the discharge 8 which is called opening differential pressure. Beyond this opening differential pressure, the valve 1 opens, the slide valve 3 then moving away from the seat 6 to allow hydraulic flow to pass through the body 2, from the intake opening 7, towards one or more discharge openings 8.

In such an arrangement, the displacement of the slide valve is even smaller as the stiffness of the spring is high for the same seat diameter, and this displacement conditions the fluid passage section. This displacement depends on the pressure difference on both sides of the valve. In practice, the displacement, and thereby the same passage section of the valve increases very slightly with the flow passing through the valve.

Thus, in such a valve, as shown in FIG. 2, the increase in the flow denoted D induces a significant increase in the pressure drops, in accordance with the curve marked by C.

In practice, such a valve is expected to provide a substantially constant pressure drop, that is to say that does not increase when the flow increases. The purpose of the invention is to provide a valve arrangement introducing a substantially constant pressure drop.

DESCRIPTION OF THE INVENTION

To this end, the object of the invention is a pressure valve comprising a body including at least one discharge opening and one intake opening provided with a seat, a fluid being able to pass from upstream to downstream from the intake opening to at least one discharge opening, a slide valve sliding in a housing of this body opposite the seat, this slide valve including a cylindrical skirt closed by a head to delimit with this housing a chamber, a biasing element tending to bring a flank of the slide valve head closer to a face of the seat, a sealing lip by which the flank of the head and the face of the seat are maintained at a distance when the head is bearing on the seat under the action of the biasing element, the head including at least one hole passing through its flank to communicate the chamber with at least the discharge opening, each hole opening into a space communicating with each discharge opening, being located opposite the face of the seat and downstream of the lip relative to the intake opening, this annular space delimiting with the lip a widening forming a diverging portion for the fluid passing through the valve in order to reduce the pressure in the chamber by the Venturi effect when the slide valve is open.

With this arrangement, the internal chamber is depressurized by the Venturi effect to increase the opening of the slide valve when a large flow passes through the valve.

The invention also relates to a valve thus defined, wherein the lip is carried by the face of the seat.

The invention also relates to a valve thus defined, wherein the lip is carried by the flank of the head.

The invention also relates to a valve thus defined, comprising an intake opening and two discharge openings arranged in a disposition corresponding to the letter T.

The invention also relates to a valve thus defined, wherein the slide valve head includes a conical or spherical flank, and wherein the seat includes a conical or spherical face carrying a lip.

The invention also relates to a valve thus defined, wherein the slide valve head includes a spherical flank, and wherein the seat includes a spherical face carrying a lip.

The invention also relates to a valve thus defined, wherein the slide valve head includes a spherical flank, and wherein the seat includes a conical face carrying a lip.

DETAILED DESCRIPTION OF PARTICULAR EMBODIMENTS

Figure 1:
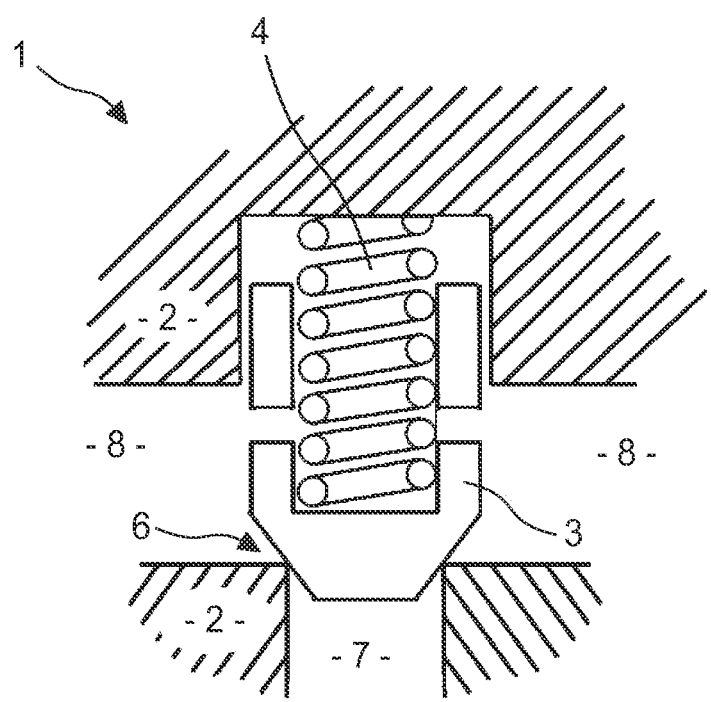
FIG. 1 is a sectional view of a valve known from the prior art.
Figure 2:
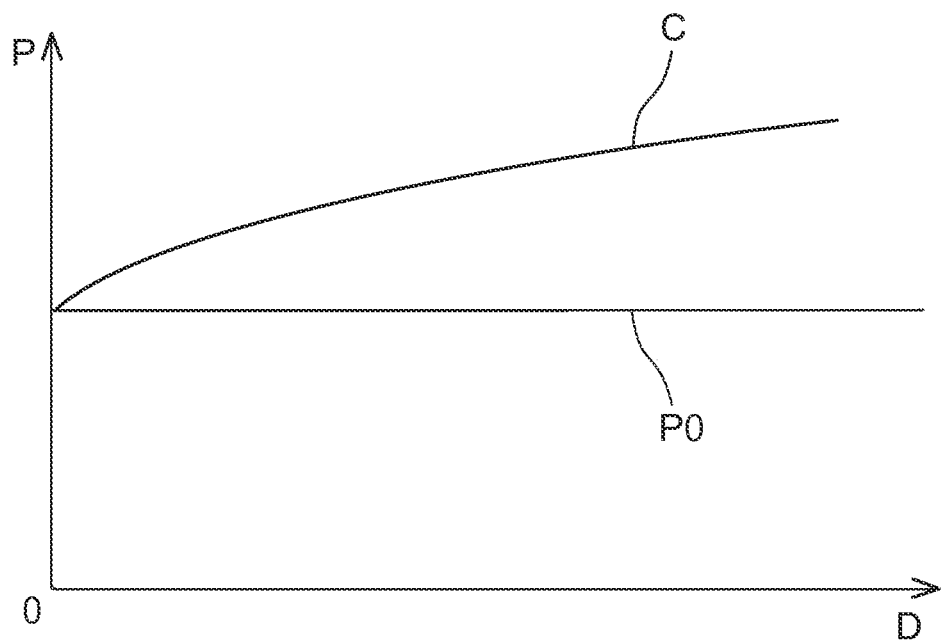
FIG. 2 is a graph representative of the increase in the pressure drop C with the increase in the flow D and in the pressure P with the valve known from the prior art, from a threshold opening pressure P0.
Figure 3:
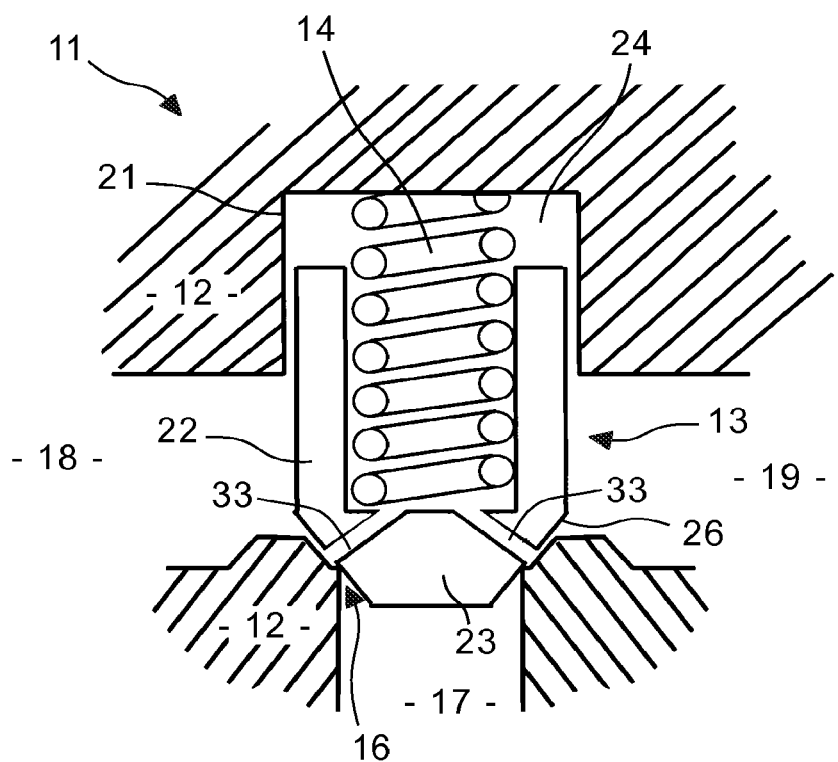
FIG. 3 is a sectional view of a valve according to the invention.

In FIG. 3, the pressure valve according to the invention which is identified by 11 includes a body 12 wherein is mounted a sliding valve 13 with a system for returning in a position (or else biasing element) such as a spring 14 tending to press this slide valve against a seat 16 of an intake opening 17 of this body 12 (which can be produced with several parts) which also includes one or more discharge openings 18 and 19. The discharge opening(s) may be freely located behind the seat.

The slide valve 13 is located opposite the seat 16 of the intake opening 17, this seat 16 thus delimiting the internal mouth-piece of this opening 17. The slide valve 13 is mounted in a corresponding housing 21 of the body 12, located opposite the seat 16.

This slide valve 13 has a general shape of revolution, comprising a cylindrical skirt 22 which is open on the side of the housing 21 and which is closed by a slide valve head 23 opposite the seat 16.

As can be seen in FIG. 3, the housing 21 has the shape of a cylindrical blind hole having an internal diameter corresponding to the external diameter of the skirt 22, so that the slide valve 13 slides in the cylindrical housing 21, delimiting jointly with the latter an internal chamber 24 whose volume decreases when the slide valve moves away from the seat 16 and increases when it is pressed against this seat 16 by the spring 14.

The head 23 of the slide valve has a general conical or spherical shape to form a contact surface 26, also called seat.

Figure 4:
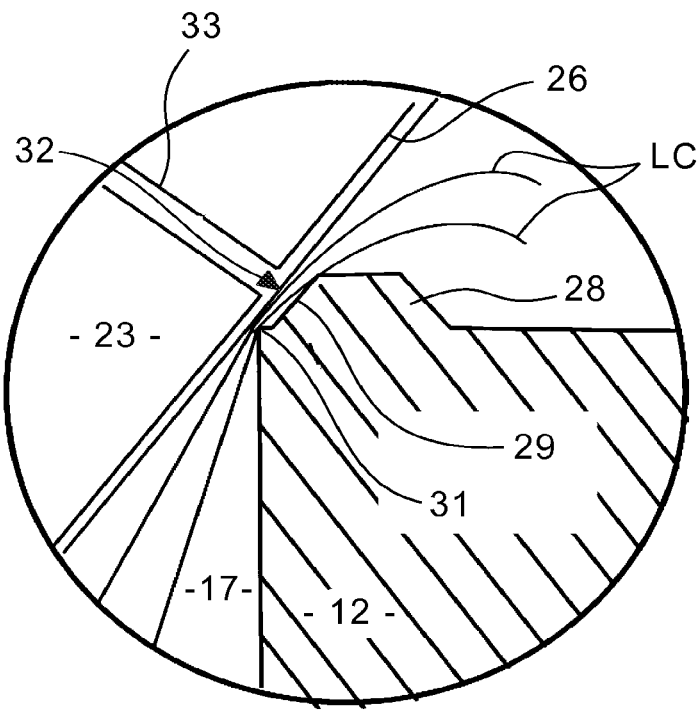
FIG. 4 is a detail sectional view of the fluid flow in the vicinity of the seat in the valve according to the invention.

As can be seen more clearly in FIG. 4, the seat 16 includes a circumferential edge or rib 28 which surrounds the opening 17 at its internal mouth-piece projecting towards the valve. This edge 28 is internally delimited by a conical crown 29 face located opposite the flank 26.

Additionally, the seat 16 includes at its base, that is to say in the region through which the conical or spherical ring 29 is connected to the cylindrical internal face of the intake opening 17 a circumferential flange or lip 31, which projects from the conical crown 29 in the direction of the conical or spherical flank 26.

When the slide valve 13 is closed, its conical or spherical flank 26 is bearing on the lip 31 to establish a sealed closure, and an annular region 32 remains between the flank 26 and the crown 29 which extend parallel to each other while being radially distant from each other.

In addition, the head 23 of the slide valve includes one or more through holes 33 formed through the wall delimiting the flank 26 and which open into the chamber 24 of the slide valve 13 in order to communicate it with the annular region 32, that is to say with the discharge opening(s) 18, 19.

As can be seen in FIG. 4, the lip 31 delimits with the annular space 32 a widening forming a diverging portion which allows generating an aspiration effect when a flow passes through the valve 11. In other words, and as illustrated in FIG. 4, the current lines LC move apart from each other when they enter into the annular space 32 forming a diverging portion.

More particularly, when the pressure in the intake opening 17 exceeds a threshold depending in particular on the stiffness and the pretension of the spring 14, the slide valve 13 retracts in the housing 21 by sliding against the spring 14, so that the flank 26 substantially moves away from the lip 31, which delimits a fluid passage section in the shape of a conical or spherical crown.

After having crossed this passage section, the fluid reaches the annular region 32 which provides a larger passage section because the face 29 is radially set back relative to the lip 31. Due to this increase in the passage section, the fluid undergoes a Venturi effect so that its pressure decreases, which generates an aspiration effect through the holes 33 causing a reduction in the pressure in the chamber 24.

The holes 33 thus constitute depressurisation holes in the chamber 24: the pressure in these holes is lower than the outlet pressure thanks to the suction effect caused by the Venturi effect resulting from the passage of the fluid in the diverging annular region 32 downstream of the lip 31.

As can be seen in FIG. 3, the chamber 24 being substantially sealingly delimited by the housing 21 and the slide valve 13, the reduction in the pressure in this chamber 24 causes an increase in the setback of the slide valve, the flank 26 of which deviates more strongly from the lip so as to increase the fluid passage section.

Thanks to this operation, an increase in the flow when the valve is open tends to open this valve more strongly to increase the passage section. More concretely, at first, an increase in flow results in a greater speed of the fluid through the annular region 32, which increases the Venturi effect, and thereby the pressure drop in the holes 33 and in the chamber 24. This decrease in the pressure in the chamber 24 causes a greater setback of the slide valve 13, that is to say an increase in the passage section when the flow increases.

Figure 5:
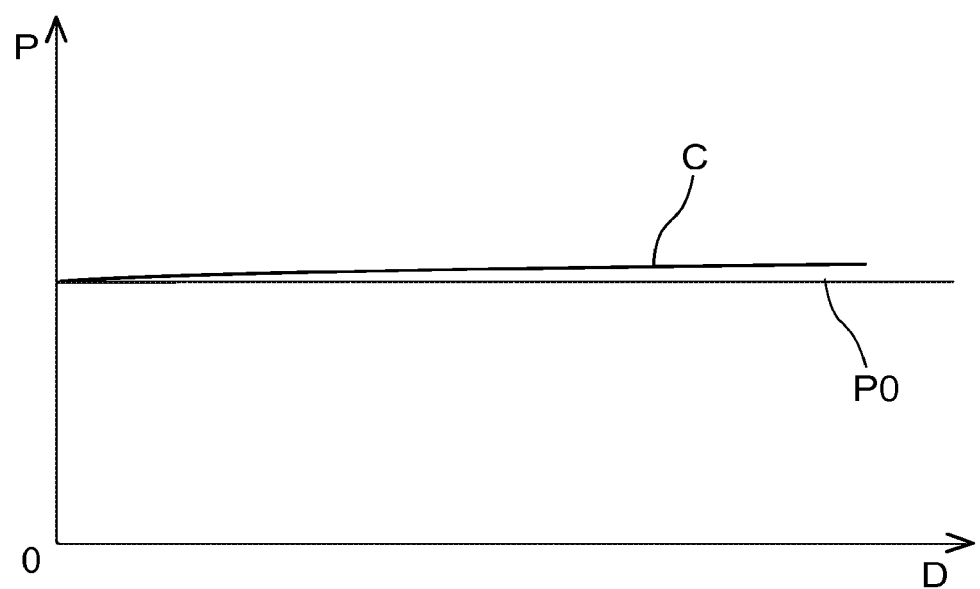
FIG. 5 is a graph showing the very small variation in the pressure drop C with the increase in the flow D and the pressure P with the valve according to the invention from an opening threshold pressure P0.

Thus, the pressure drop introduced by the valve is substantially constant due to the fact that the passage section provided by this valve fluctuates with the flow. Under these conditions, it is possible to dimension the valve to obtain a pressure drop C which is substantially constant relative to the flow D passing through the valve, as illustrated by the curve C in FIG. 5, which shows the slight change in pressure drop denoted P with the flow.

The invention claimed is:

1. A pressure valve comprising:
a body including at least one discharge opening and at least one intake opening provided with a seat, a fluid being able to pass from upstream to downstream from the intake opening to the at least one discharge opening, a slide valve sliding in a housing of said body opposite the seat, said slide valve including a cylindrical skirt closed by a head to delimit with said housing a chamber, a spring tending to bring a flank of the head closer to a face of the seat, a sealing lip by which the flank of the head and the face of the seat are maintained at a distance when the head is bearing on the seat under the action of the spring, the head including at least one hole passing through the flank of the head to communicate the chamber with at least the at least one discharge opening, a first end of the at least one hole opening into an inner diameter of the spring, a second end of the at least one hole opening into an annular space communicating with the at least one discharge opening, being located opposite the face of the seat and downstream of the sealing lip relative to the intake opening, said at least one hole extending in a direction perpendicular to the face of the seat, said annular space delimiting with the sealing lip a widening forming a diverging portion for the fluid passing through the pressure valve in order to reduce the pressure in the chamber by a Venturi effect when the slide valve is open,
wherein the flank of the head and the face of the seat that carries the sealing lip are conical and the flank of the head and the face of the seat are parallel.

2. The pressure valve according to claim 1, wherein the housing has a shape of a cylindrical blind hole having an internal diameter corresponding to an external diameter of the cylindrical skirt.

* * * * *